United States Patent [19]

Ksayian

[11] 4,437,677
[45] Mar. 20, 1984

[54] HAND AND/OR FOOT PROPELLED VEHICLE

[76] Inventor: Haig Ksayian, Box 52, Bear Tavern Rd., Titusville, N.J. 08560

[21] Appl. No.: 347,306

[22] Filed: Feb. 9, 1982

[51] Int. Cl.³ ............................................. B62M 1/12
[52] U.S. Cl. ........................................ 280/234; 280/240
[58] Field of Search ............... 280/233, 234, 224, 232, 280/240, 242 R, 244, 245, 246, 247, 248, 255

[56] References Cited

U.S. PATENT DOCUMENTS

| | | | |
|---|---|---|---|
| 232,620 | 9/1980 | Trautmann | 280/240 X |
| 1,154,616 | 9/1915 | Davis | 280/234 |
| 1,620,926 | 3/1927 | Trullinger | 280/234 |
| 4,305,600 | 12/1981 | Mendez | 280/240 X |

FOREIGN PATENT DOCUMENTS

| | | | |
|---|---|---|---|
| 2458110 | 7/1976 | Fed. Rep. of Germany | 280/244 |
| 787830 | 9/1935 | France | 280/255 |
| 1039755 | 10/1953 | France | 280/246 |
| 217380 | 2/1942 | Switzerland | 280/224 |

*Primary Examiner*—John A. Pekar
*Attorney, Agent, or Firm*—Lackenbach, Siegel, Marzullo, Presta & Aronson

[57] ABSTRACT

A wheeled vehicle propelled by a rider comprises a frame, front and rear wheels rotatably mounted on the frame; and a tiller tube, provided with handle bars and foot pedals which may be used separately or together for providing oscillatory movement thereof about a pivotal axis of the tiller tube. The vehicle further includes cable drive means and at least one unidirectional clutch which when driven turns one or more wheels, preferably the rear wheels. The ends of the cable are rotatably anchored to a sheave mounted on the tiller tube, and means are provided for moving the sheave up and down the tube in infinitely variable increments for changing from a high-speed to a low-speed position and vice-versa so as to provide suitable speed changing. Means are also provided on said vehicle for braking and steering.

45 Claims, 29 Drawing Figures

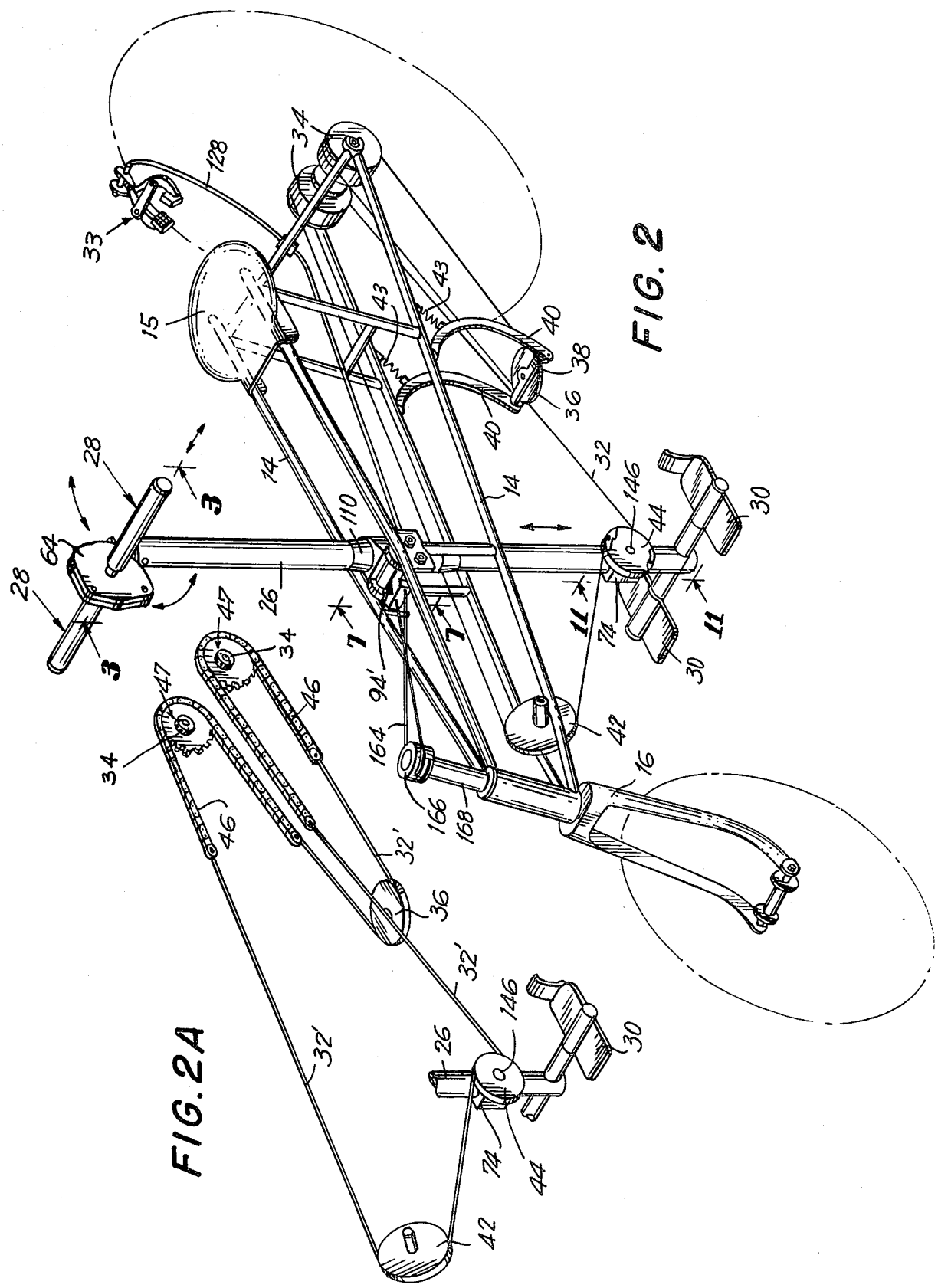

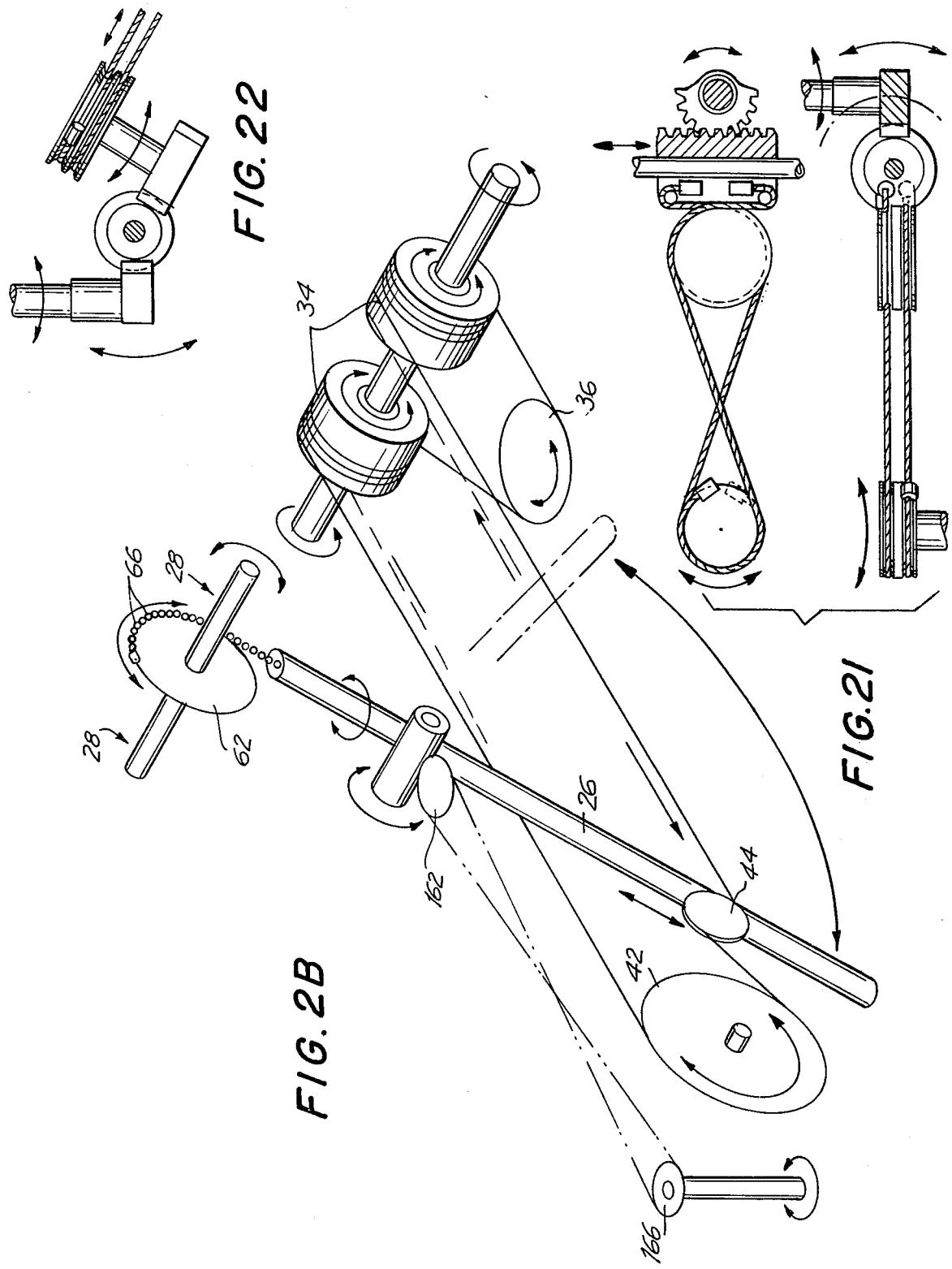

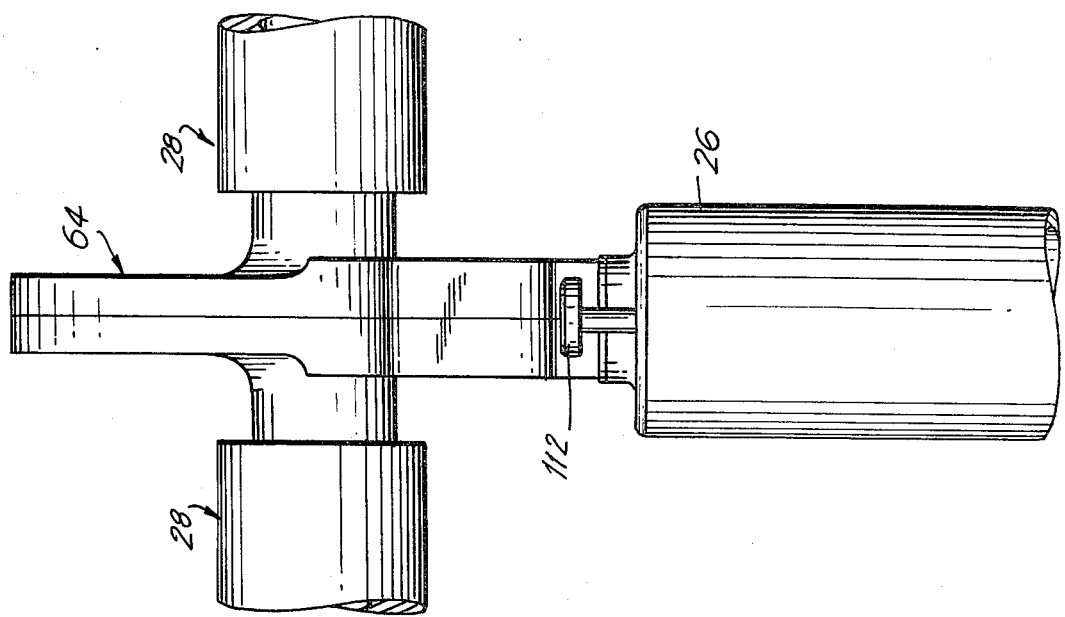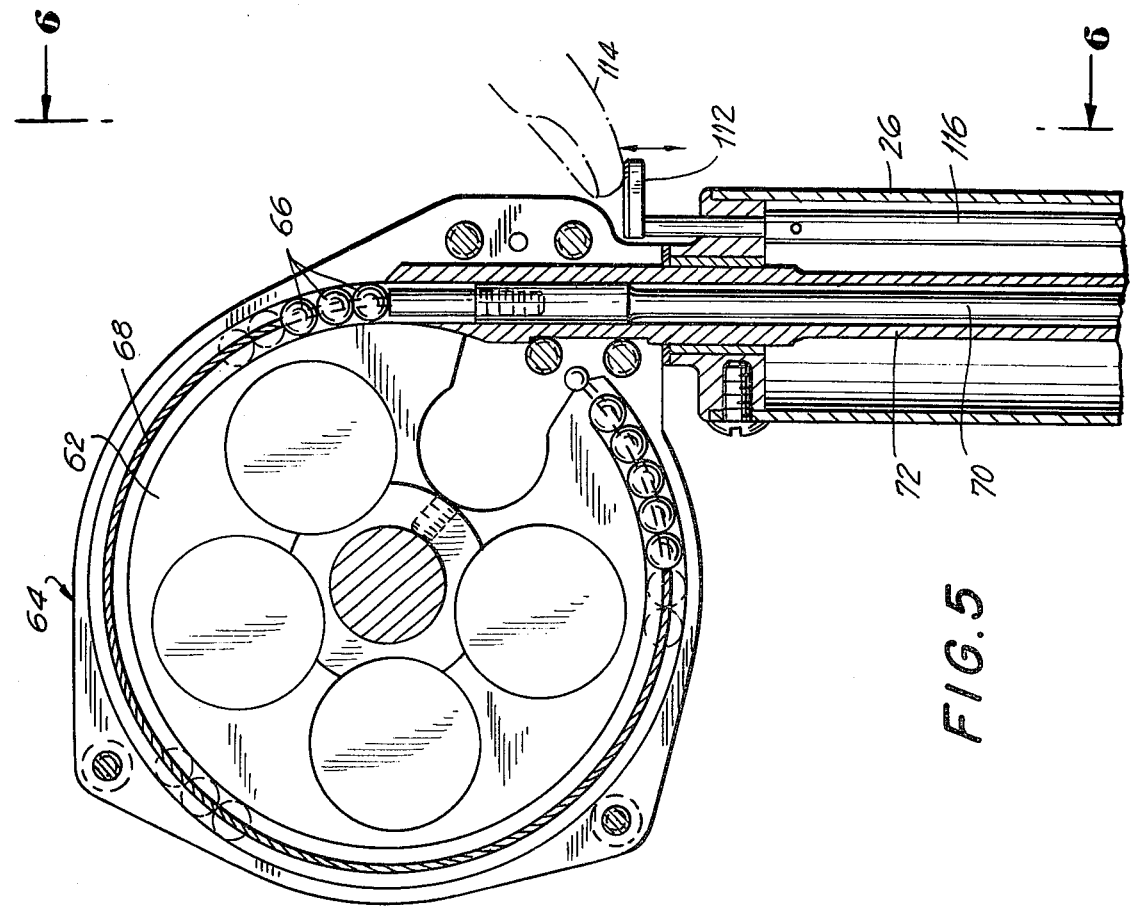

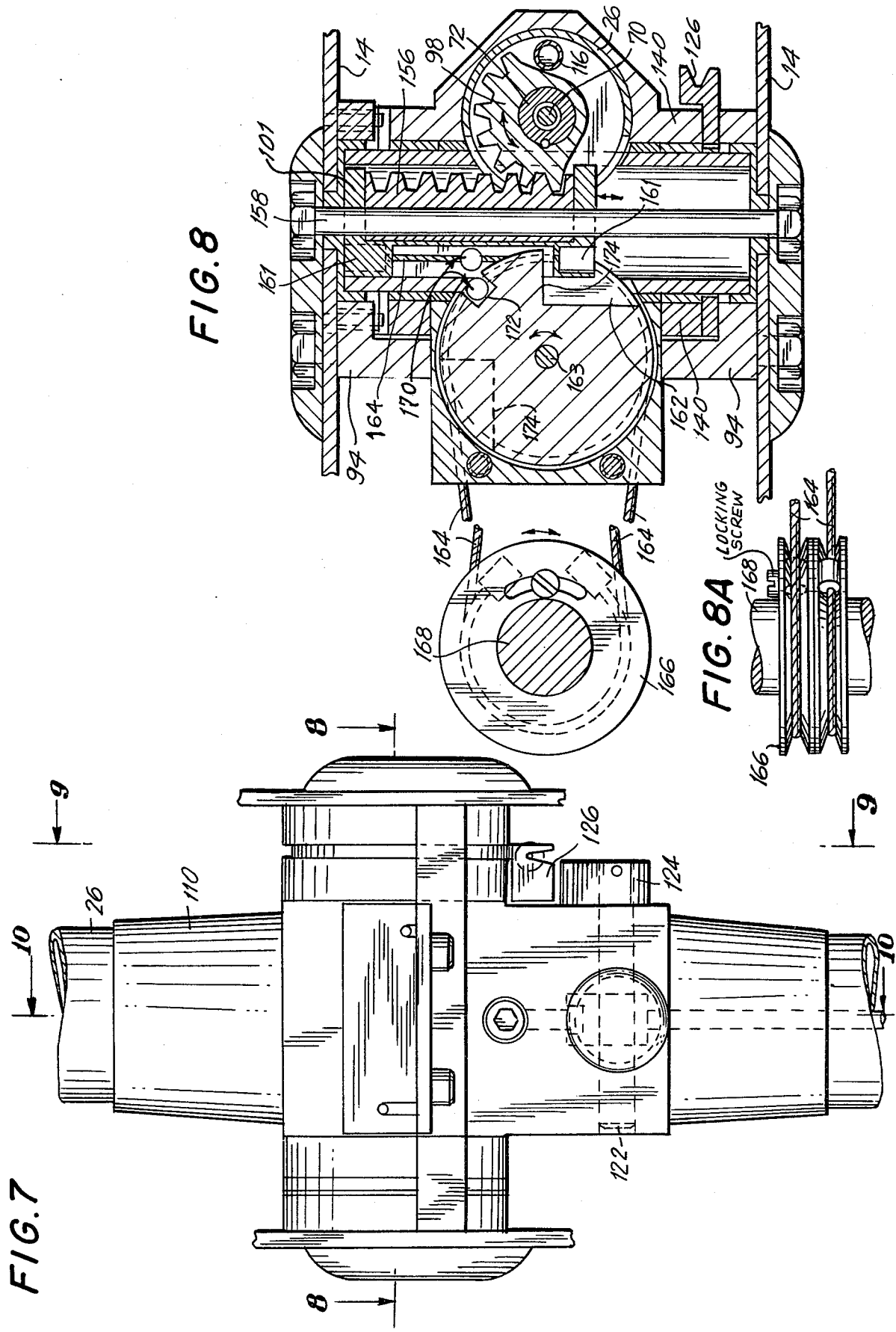

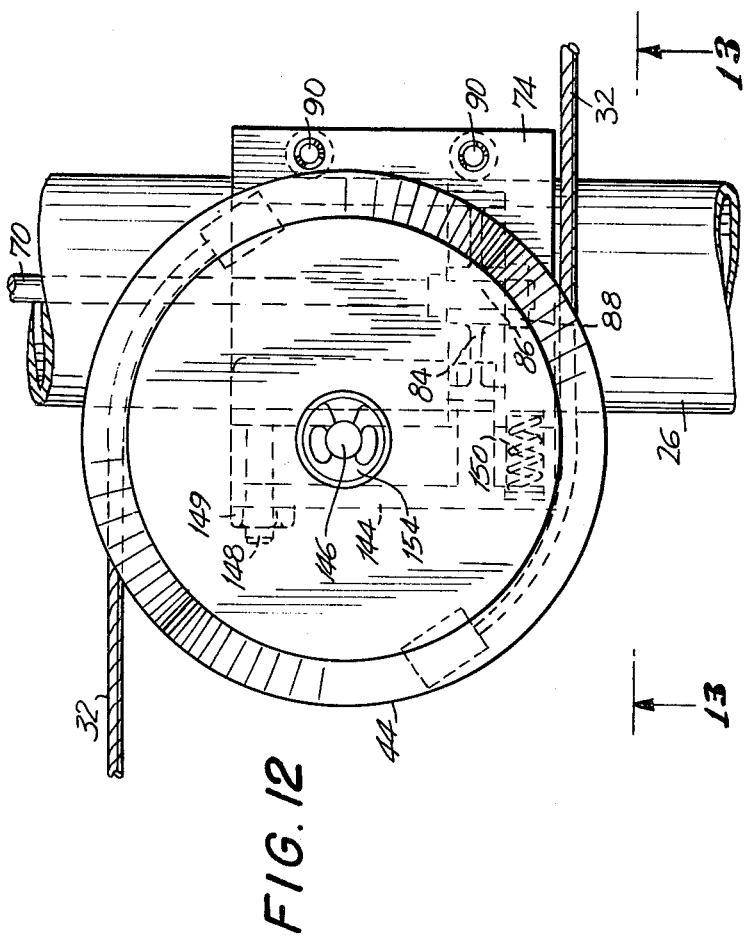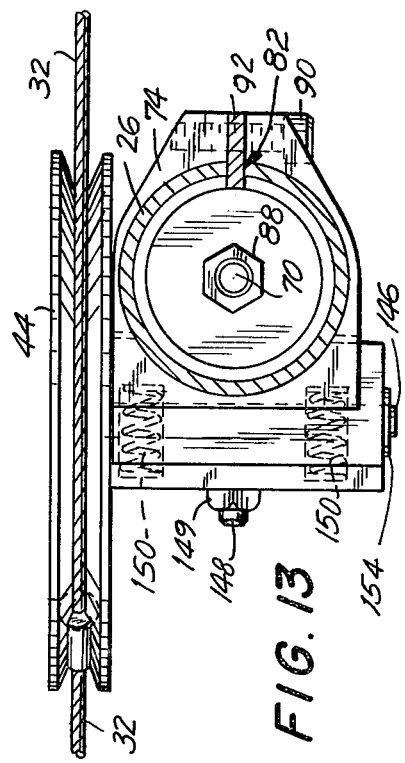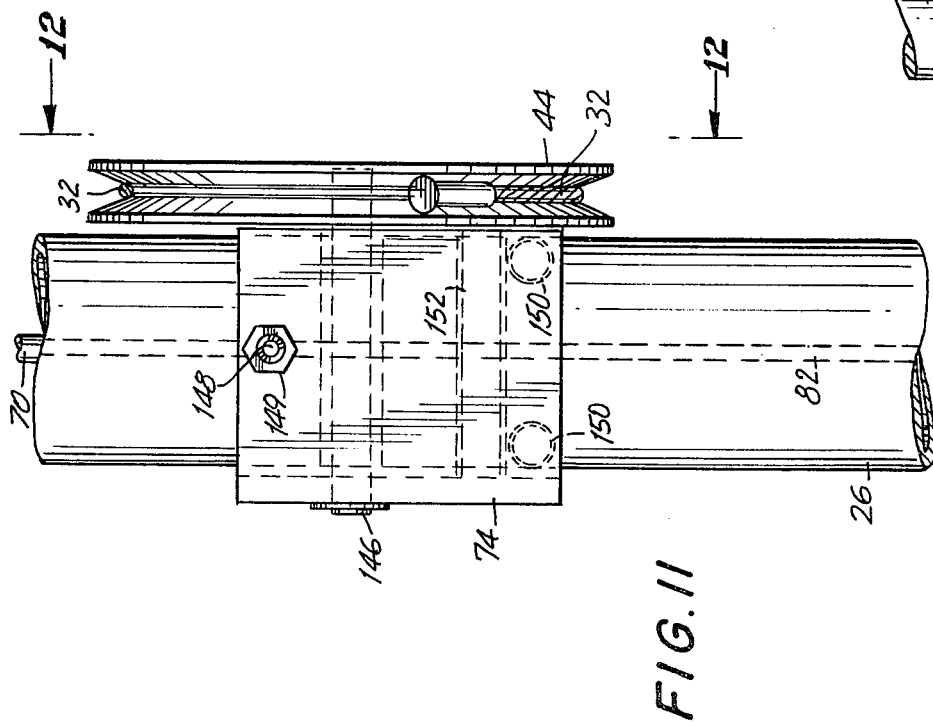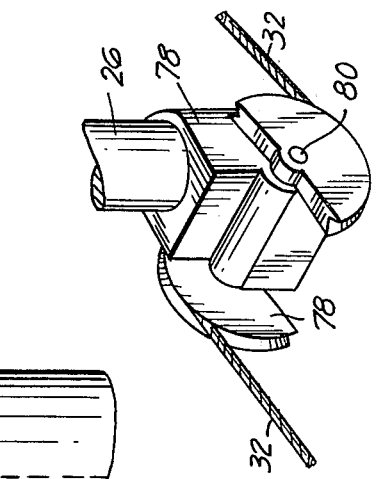

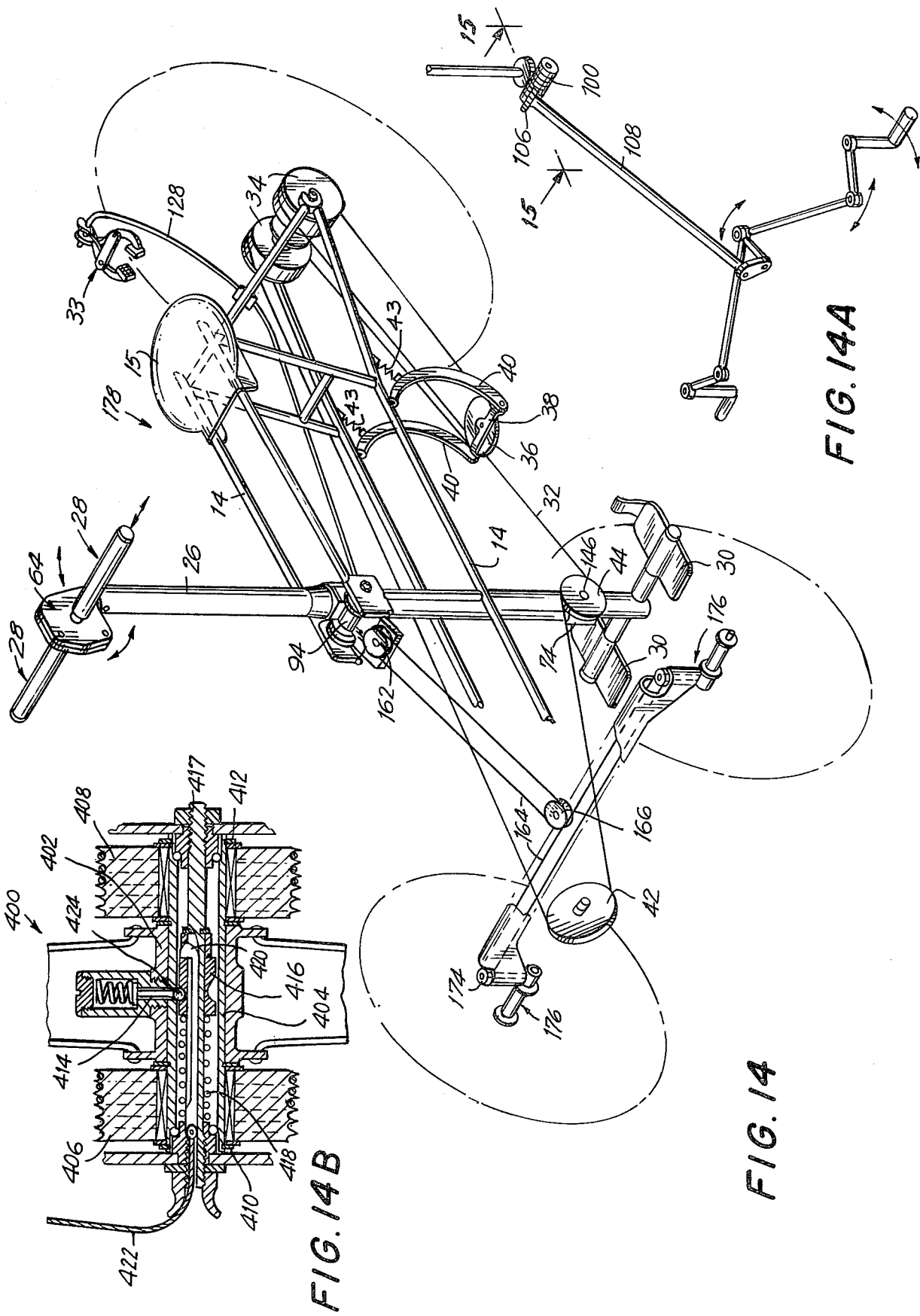

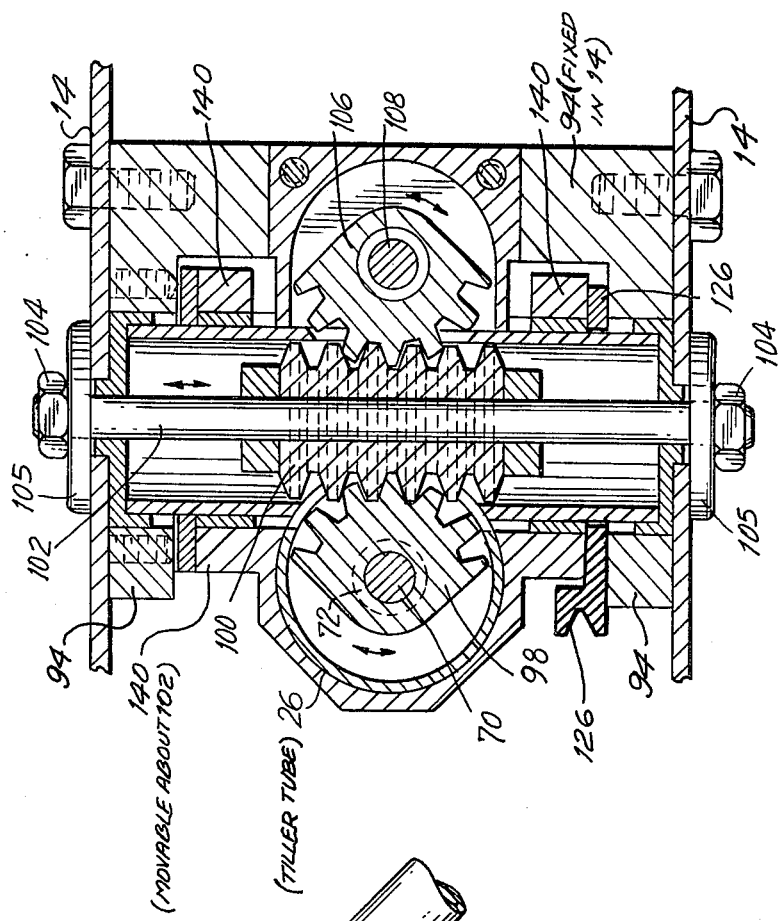
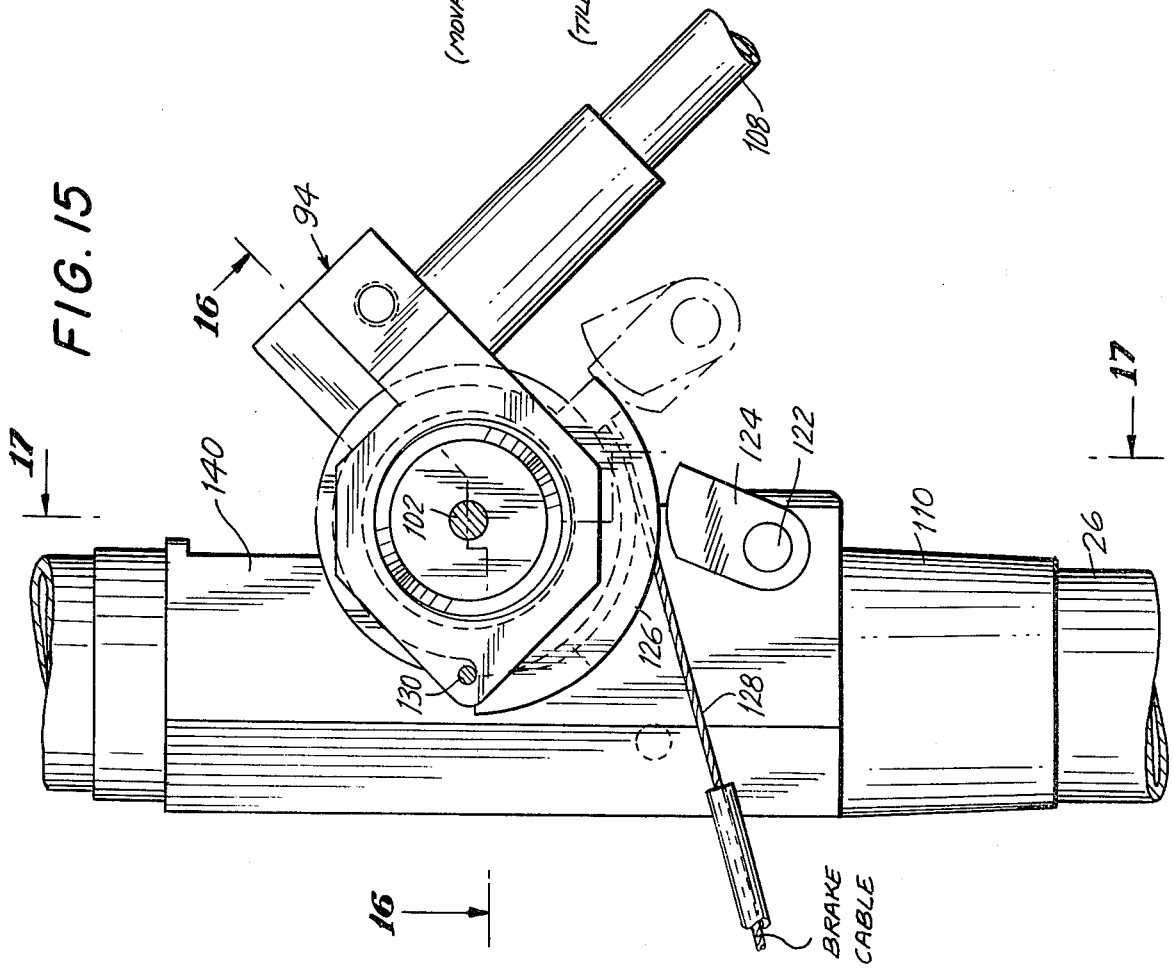

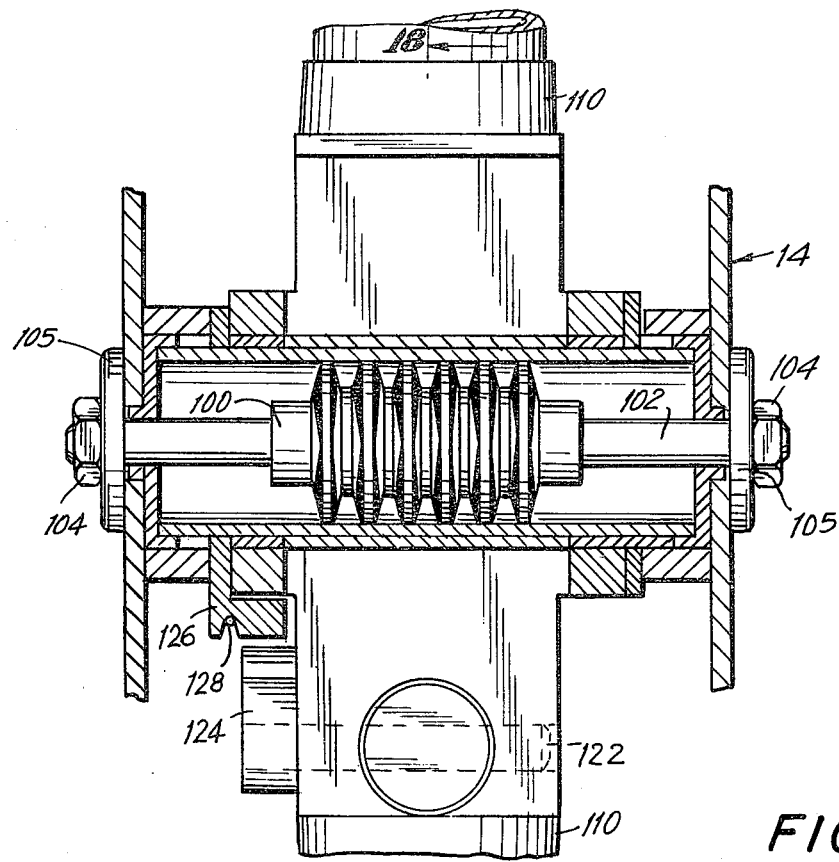
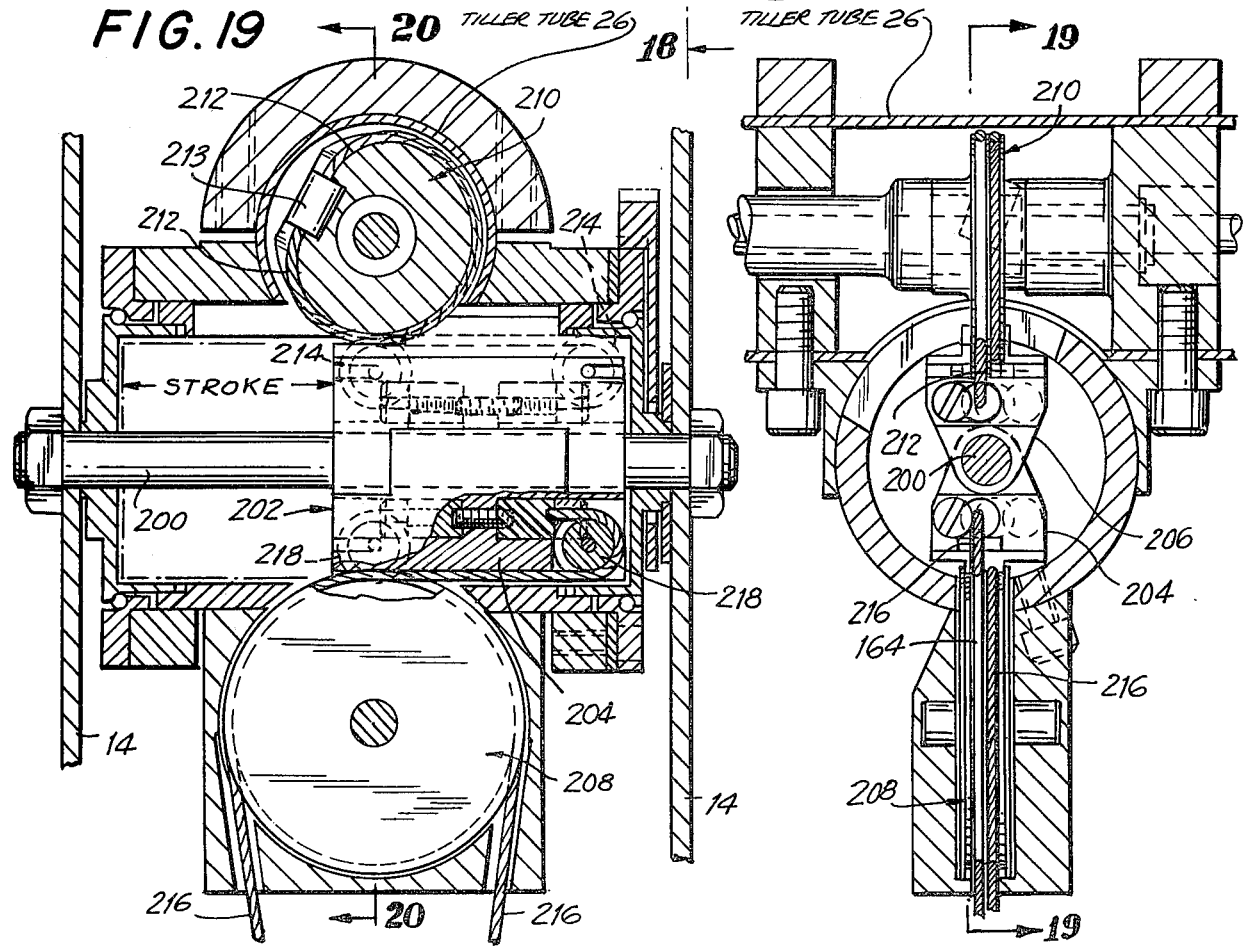

HAND AND/OR FOOT PROPELLED VEHICLE

This invention relates to improvements in bicycles and tricyles and, more particularly, to an improved hand and/or foot actuated type of vehicle embodying an oscillating drive member or tiller tube mounted to pivot about an axis transverse to the vehicle.

BACKGROUND OF THE INVENTION

The present invention pertains to an improved tiller tube column or shaft unit for a bicycle, tricycle or even quadricycle vehicle of the type having a drive cable system embodying conventional unidirectional (one-way) clutches mounted on the drive wheel or wheels of the vehicle, more specifically, the invention deals with the means for steering, changing speeds, and for braking such a vehicle.

Vehicles of a similar type have been known in the past and have been described to some extent in certain U.S. patents including U.S. Pat. Nos. 1,620,926; 1,154,616; 3,986,725; 1,653,889; 3,285,618; 1,529,012; 3,884,501; 3,895,825; and in an article in the Oct. 6, 1980 issue of Design News, entitled "Push-Pedal Bike Folds for Carrying". Although no tiller tube is employed in this foldable bike dubbed the "Urban", the bike is powered by up-and-down motion applied to pedals which pull a cable over a V-groove roller clutch sleeve which turns the drive wheel. Such prior art bicycles or vehicles of this type all involve complex heavy structures and are otherwise impractical and unsatisfactory for today's bikers who demand improved constructions of lighter design and better characteristic features.

Other prior art bicycles are shown in the following U.S. Pat. Nos. 3,485,509; 616,021; 3,834,733; 293,366; 248,531; 449,498; 618,580; 3,760,905; 3,954,282; 3,913,945; 3,498,634; 2,232,120; 2,198,942; and 4,063,747.

Further U.S. Pat. Nos. 3,889,974; 3,831,978; 3,375,023; 3,984,129; 3,920,263; 293,366; 3,834,721; 4,119,326; 4,005,611; 3,759,543; 617,273; 3,834,733 and 4,026,571 disclose other bicycle and tricycle designs embodying certain common elements, such as cable drive systems, but none of these prior art patents are believed to have attracted interest in recent years due also in part to their probably high cost and complicated constructions. Additional "Mechanical Drives For Human Power" for use with bicycles and tricycles are disclosed in the March 1981 issue of Design Engineering, but these systems are basically variations and modifications of the conventional roller-chain drive which still represents the most common drive system for practically all human powered vehicles.

SUMMARY OF THE INVENTION

It is an object of the invention to provide a hand and/or foot actuated wheeled vehicle which is relatively simple in operation and which contains controls to all of the systems governing steering, changing speeds and braking.

It is a further object of the invention to provide such a hand and/or foot actuated shft or tiller tube which has an improved structure with controls which are relatively simple to operate and which are controlled by hand.

It is still a further object of this invention to provide an improved drive cable system which can be adjusted from a low-speed or hill climbing condition to a high-speed or level ride condition while the bicycle or tricycle of the invention is in motion and operation.

Still another object of the invention is to provide a vehicle which can be economically manufactured and one which is more reliable and sturdier in construction than a more conventional bicycle or tricycle.

These and other objects of the invention will become apparent as the following specification is read, particularly with reference to the accompanying drawings which illustrate several embodiments of the invention.

BRIEF DESCRIPTION OF THE DRAWINGS

FIG. 2 is a perspective view showing in greater detail the cycle shown in FIG. 1, but with the wheels and fenders removed therefrom;

FIG. 2A is a fragmentary view showing also in perspective an alternate construction of the drive system embodying a chain drive, in lieu of a cable and pulley system, which is suitable for use in either the bicycle or tricycle modifications of the novel cycle of the present invention;

FIG. 2B is a diagramatic view, in perspective, of a typical cycle of the invention with a rear shaft capable of supporting one or a pair of rear wheels;

FIG. 5 is a cross-sectional view taken along the line 5—5 of FIG. 3;

FIG. 6 is a side elevational view in the direction of line 6—6 of FIG. 5, showing the push button used to activate the braking action;

FIG. 7 is a side elevational view in the direction of line 7—7 of FIG. 2 showing the steering cable puller and steering housing which is secured to the frame of the bicycle;

FIG. 8 is a cross-sectional view taken along the line 8—8 of FIG. 7, and showing in detail on the left side thereof a top view of the steering cable puller and steering spindle;

FIG. 8A is a side elevational view of the steering spindle;

FIG. 11 is a side elevational view in the direction of line 11—11 of FIG. 2, showing the anchoring arrangement of the drive cable puller;

FIG. 11A is a fragmentary view in perspective of an alternate construction of the drive cable puller, illustrating two half pulley wheels on opposite sides of the cable puller, in lieu of a single pulley wheel for locking in place both ends of the drive cable;

FIG. 12 is a side elevational view thereof, taken along the line 12—12 of FIG. 11;

FIG. 13 is a top view of the drive cable puller, taken along the line 13—13 of FIG. 12;

FIG. 14 is a perspective view of an alternate construction in the form of a three-wheel cycle embodying my invention;

FIG. 14A is a schematic view of an alternate steering arrangement, embodying push-pull linkage rods similar to conventional automotive steering;

FIG. 14B is a fragmentary cross-sectional view through a typical rear axle showing the one-way clutches; and an optional device for permitting "free wheeling" and releasing of the rear wheel or wheels so that the vehicle can be rolled backwards, if desired;

FIG. 15 is a side elevational view in the direction of line 15—15 of FIG. 14A, showing the brake cable puller and steering housing which is secured to the frame of the tricycle;

FIG. 16 is a cross-sectional view, taken generally along the line 16—16 of FIG. 15, and showing a shaft steering system with a circular rack, in lieu of the cable steering system and straight pivoting rack;

FIG. 17 is a side elevational view in the direction of line 17—17 of FIG. 15, showing the circular rack;

FIG. 19 is a cross-sectional view taken along the line 19—19 of FIG. 20, showing an alternate cable steering mechanism; and FIG. 20 is a cross-sectional view taken along the line 20—20 of FIG. 19; and FIG. 21 are schematic views of a cable steering embodiment employing a non-pivoting circular rack means; and FIG. 22 is a fragmentary view showing an alternate steering arrangement embodying a translatable circular rack and cable steering means.

DESCRIPTION OF THE PREFERRED EMBODIMENTS

Figure 1:
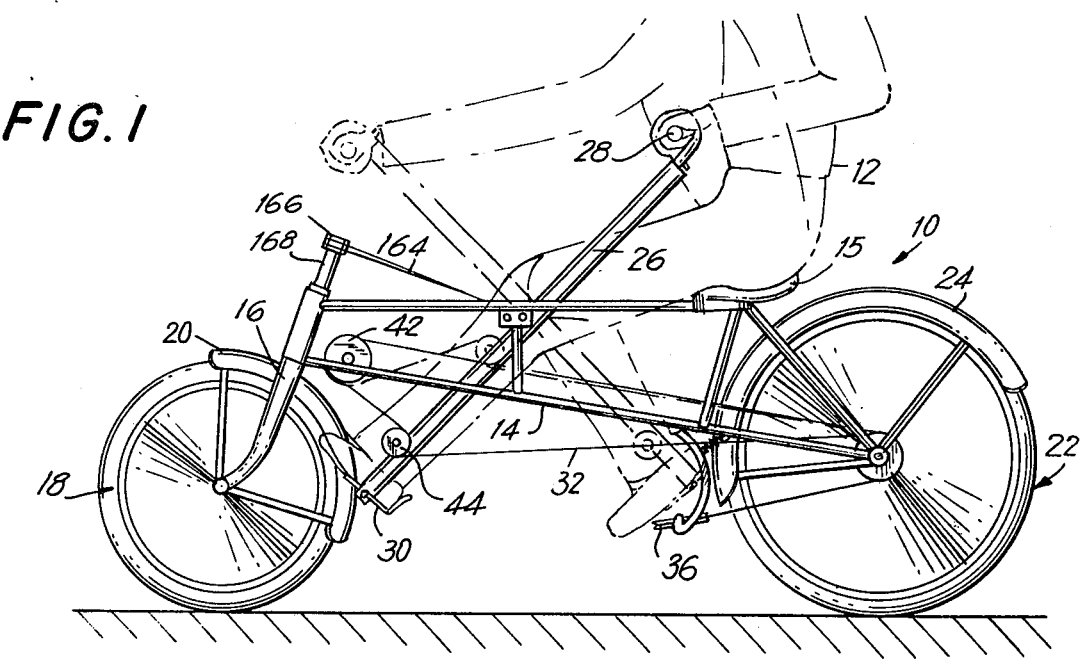
FIG. 1 is a side elevational view of a new and novel two-wheel cycle embodying my invention.

Referring now to FIGS. 1-2B, and in particular to FIGS. 1-2, there is shown my novel bicycle embodiment of the invention. As shown therein, the bicycle 10 is operated in a seated position by an operator shown in phantom at 12. The bicycle 10 comprises a frame 14, including a seat 15, suitably of the ajustable type, and a front fork 16 accommodates a front wheel 18 and front fender 20 with a rear wheel 22 and rear fender 24 suitably mounted at the rear of the frame.

As best shown in FIG. 2, a pivoted tiller tube column or shaft 26, having a pair of handle grip bars 28 at the upper end of the tiller tube 26 and a pair of foot pedals 30 at the lower end thereof provides for the manual arm and foot power delivered to the drive cable 32 which in turn is wrapped about a suitable pair of conventional, rear axle mounted, unidirectional (one-way) clutches 34 suitably mounted on a rear wheel shaft (now shown). The drive cable 32 is wrapped about the helical grooves of the unidirectional clutches 34. The number of wraps around the unidirectional clutches is either equal to or greater than the revolutions of the clutches, because of the stroke of the tiller tube reaching the highest maximum stroke speed position. The cable should be locked or secured to the drums by means, such as a clamp or screw to prevent the cable from gradually "creeping" so as not to run off the drum. Conventional caliper brakes 33 may be employed to slow and stop the bicycle or tricycle of the invention, but only one is shown at the rear wheel 22 for the purposes of illustration. A lower idler wheel, such as a jockey pulley 36 for the drive cable 32 is suitably pivoted or adjustable by means of bridge element 38 connected to a pair of downwardly extending strut elements 40 which are suitably pivoted and spring loaded by springs 43, such as compression springs extending from the bike frame 14; thereby maintaining a predetermined tension on the cable since there is a slight difference in cable length between a high-speed or level ride condition and a low-speed or hill climbing conditions. Also, secured to the frame 14 is a pulley 42 which is fixed in position in the frame 14. The ends of the drive cable 32 are suitably secured and achored to a translatable, rotatably mounted pulley-like disk or sheave 44. This sheave 44, as will be explained hereinafter, when moved up the tiller tube shaft 26 is shifted to a lower speed or hill climbing condition, and when moved downwardly is shifted to a high-speed or level ride condition. It will be appreciated that jockey pulley 36 is spring loaded as it is always on the slack side of the cable 32, whereas pulley 42 is rigidly secured to the frame 14 because it is under full load tension when the tiller tube 26 is pushed forward.

As best shown in FIG. 2A, the drive system may also comprise a pair of chains 46 secured to cables 32, and sprocket gears 47 for driving the unidirectional clutches 34. Such a cable-chain drive system may be preferred in certain bicycle and tricycle constructions where a cable-pulley system may not be as desirable. However, only relatively short lengths of chain are required and the remaining portion of the drive system of FIG. 2A may comprise a cable which can otherwise be essentially similar to that cable shown in FIGS. 1 and 2. FIG. 2B shows diagramatically the various rotational and translational movements of the elements of a typical cycle of the present invention.

Figure 3:
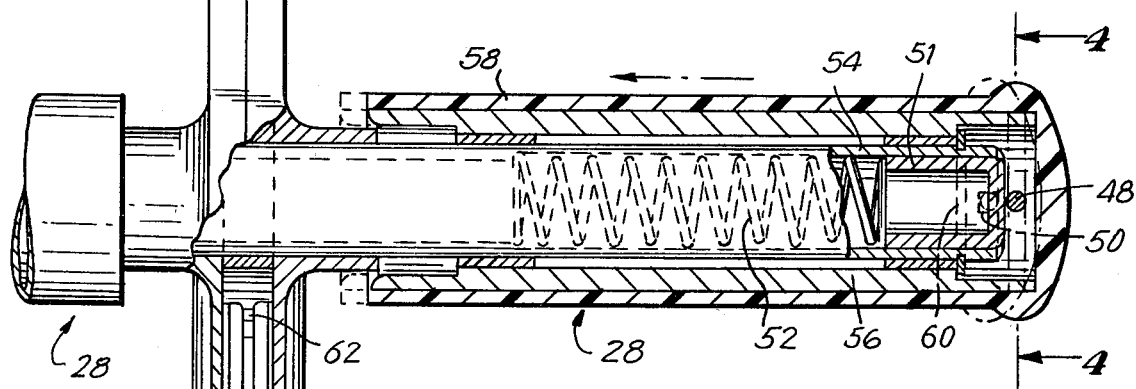
FIG. 3 is a fragmentary, cross-sectional view of one of the handle bars of the driving column or tiller tube, and showing with a reference arrow the direction of pushing a spring-loaded sliding button for changing speeds while riding the cycle.
Figure 4:
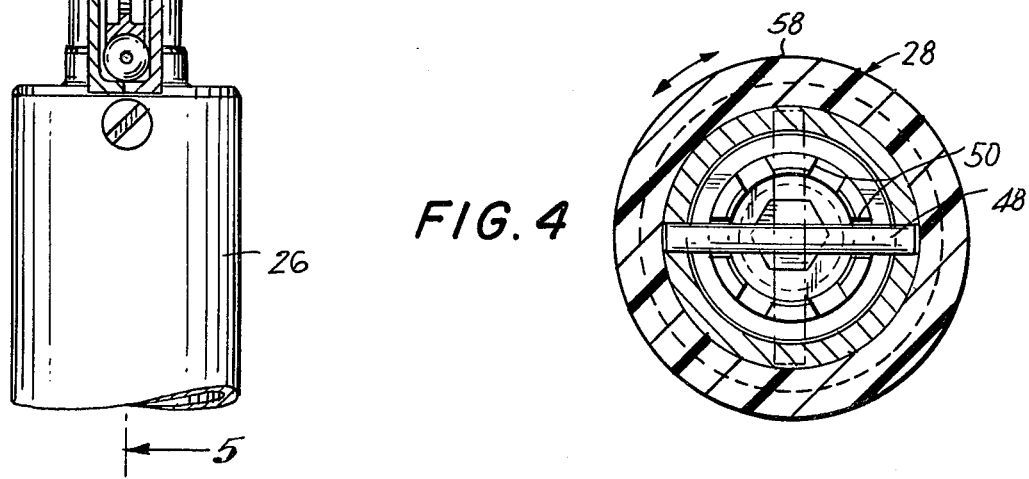
FIG. 4 is a cross-sectional view taken along the line 4—4 of FIG. 3.

In FIGS. 3 and 4, a typical handle grip bar 28 of the driving column or tiller tube 26 is illustrated. In order to change speeds, as will be discussed hereinafter in greater detail, the handle bars 28 are pushed inwardly, toward each other in the direction of the arrowhead shown therein, in order to engage rod or pin 48 fixed in sleeve 56 into a suitable slot 50 of a plurality of slots provided in the end of the hollow inner tube 54, against the slide button 51 and the spring force exerted by means of a compression spring 52, suitably held in place in the hollow inner tube 54 upon which the handle grip bars 28 and sleeve 56 are mounted. Thereafter, the handle bars 28 are turned clockwise or counter clockwise in order to change speeds. Each handle bar 28 comprises an inner sleeve 56 which supports the rod or pin 48 at its outermost end and an outer gripping member 58, such as a conventional bicycle handle grip made of rubber or other like plastic compositions. Suitably retained on to the hollow inner tube 54 by means of a retainer ring 60 or other like means is the sleeve 56. The inner tube 54 in turn is fixedly mounted or keyed to a rotatable steering drum 62 suitably mounted in a steering head or housing 64. Thus, when the handle bars 28 are pushed in and turned, the inner tube 54 is caused to similarly rotate and advance or retract a string of beads or balls 66, as best shown in FIG. 5, "threaded" to a cable 68, which beads or balls 66 in turn push or pull, according to the drum's 62 direction of rotation, a rod 70 which is suitably attached to the string of balls 66. The balls 66 are suitably guided and slide within a steering tube 72 disposed within the tiller tube column or shaft 26. The rod 70 in turn pushes or pulls the pulley-like disk or sheave 44 up and down the tiller tube column or shaft 26 to which the sheave 44 is suitably mounted by means of a sliding sleeve 74 fitted over the shaft 26. It should also be recognized that the "string of beads" if desired, can also be a flexibly molded plastic in any desired shape or form and that it is also possible to employ a chain so long as the device can be pushed or pulled in a tube.

Figure 18:
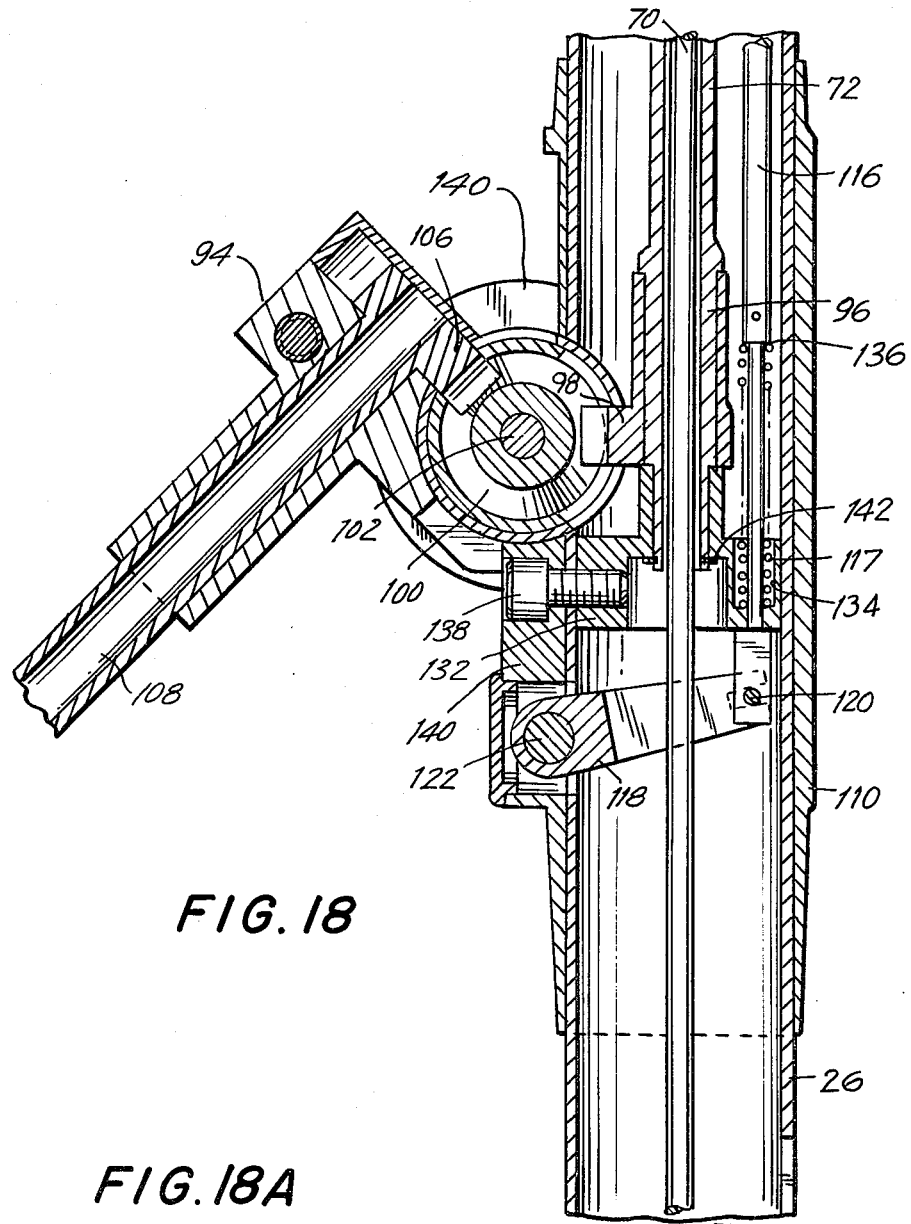
FIG. 18 is a cross-sectional view, taken along the line 18—18 of FIG. 17, but also showing in section the speed changing mechanism at the lower end of the tiller tube in the locked position.

As shown in FIG. 18, the sliding sleeve 74 travels from a low-speed to a high-speed position and is suitably guided by a suitable slot 82. Translational motion is transmitted to the sleeve 74 from the rod 70 via an anvil or plug 84 which is fixedly secured to the end 86 of the rod 70 by suitable means, such as a threaded nut 88, and by suitable engagement (notch 91) with a guide plate 92 suitably extending through the slot 82 provided in the tiller tube column or shaft 26. Alternately, the plate 92 may be rigidly connected to the sliding sleeve or housing 74 and in mutual cooperative association with the rod 70 by other suitable means. The rod 70 is thus able to push and pull both the guide plate and the sliding sleeve 74 according to the drum's 62 rotation and the straight-line or translational motion transmitted to the rod 70 by the string of beads or balls 66. Referring again to FIG. 18, the sleeve 74 may be of the split-clamp type bolted together by means of screws 90, and suitably provided for mutual cooperative association with the anvil or plug 84 is a notched plate 92 which when raised or lowered automatically moves the sleeve 74 a corresponding straight line distance.

If desired, the sheave 44 may comprise in an alternate construction, as best shown in FIG. 11A, a pair of half sheaves 78. Each half sheave 78 anchoring one end of the cable 32 and being mounted preferably on a single rotatable shaft 80 or pairs of shafts passing through a sliding sleeve or housing 74 mounted about the tiller tube column or shaft 26 to lock housing 74 in the position selected by the operator, by clamping the tube 26 between the anvil 84 and the pivoting member 152.

Referring to FIGS. 16-18, there is shown a steering housing 94 mounted to the frame 14. Disposed about the rod 70 is the steering tube 72 which has suitably mounted thereon adjacent the lower end 96 thereof a segment gear 98 which meshes with a circular rack 100 freely mounted in sliding manner on a shaft 102 (similar to shaft 158 in FIGS. 8-10) passing through the steering housing 94. Suitable nuts 104 threaded to the opposite ends of the shaft 102 bear against washers 105 and maintain the shaft 102 in place. Translational motion transmitted to the circular rack 100 by the segment gear 98 when the handle bars 28 are turned about the axis of the tiller tube 26 in turn rotates a second segment gear 106 mounted on a steering shaft 108 which may be suitably geared to a conventional steering mechanism for the front pair of wheels of my tricycle embodiment of the invention. For example, as shown schematically in FIG. 14A, the circular rack 100 rotates the segment gear 106 secured to the steering shaft 108 which in turn is suitably linked to the front wheels by well known push-pull rod mechanisms which are similar to an auto steering system and are capable of transmitting the necessary turning motion to enable one to steer a tricycle or any other like vehicle. Alternatively, cable steering may also be employed with the circular rack 100 feature of the steering mechanism as will be explained hereinafter in connection with the tricycle embodiment of FIG. 14.

As best shown in FIG. 16 and 18, suitable enclosures house the overall steering mechanism so as to protect the rider as well as the various moving parts from damage; bearing in mind that the tiller tube 26 when pushed or pulled is pivoted about the shaft 102 at about the point in which the shaft 102 is fixedly mounted to the frame 14. Also, a strengthening tube 110 reinforces the tiller tube 26 at the area where the steering mechanism is housed.

Figure 10:
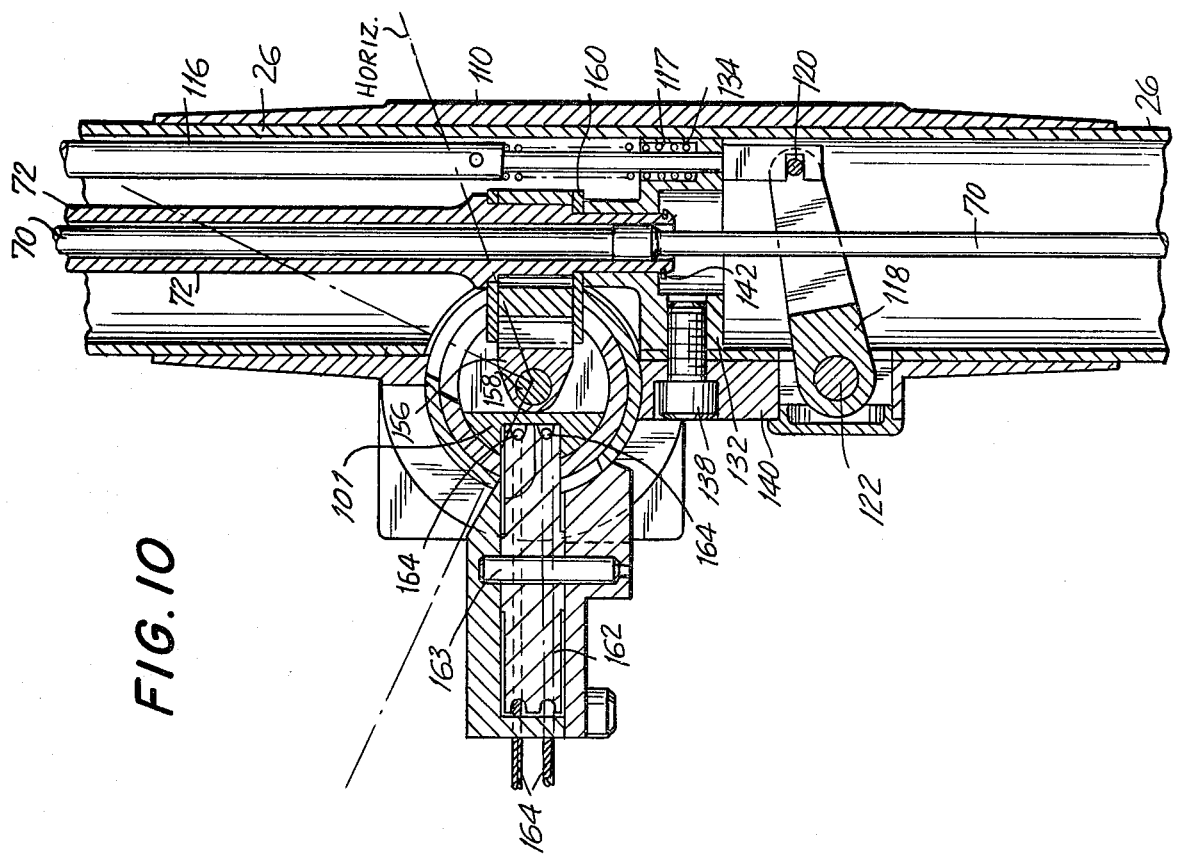
FIG. 10 is a fragmentary view, in cross-section, of an embodiment of the invention employing cable steering, and showing in greater detail a straight pivoting rack of the cable puller, and the lower end of the braking system and push rod.

When braking, a brake button 112 is first actuated by pushing same down, as best shown in FIG. 5, by means of one's finger 114 illustrated in phantom. The brake button 112 is connected to a brake rod 116 which is spring loaded by spring 117, as shown in FIG. 10, to maintain the brake button 112 in a constantly upward position. The brake rod 116 in turn activates a lever arm 118 through the action of a pin 120. The lever arm 118 rotates shaft 122 which in turn moves cam 124 which presses up against a brake actuator 126, as shown in FIGS. 9, 10, 15 and 18. The brake cable 128, of course, is suitably connected to conventional rear caliper brakes 33, as shown in FIG. 1, but suitable arrangements may be similarly made for a set of front wheel caliper brakes. In FIG. 15, the cam 124 is also shown in phantom which is the position the tiller tube 26 would be in at the other end of its stroke, which incidentally is in the order of about 90 degrees. A pin 130 suitably anchored to the frame is the stop for the brake shoe 126 which is maintained in that position by the brake tension. When the brake is to be activated, the brake button 112 is pressed down and the handle grip base 28 are pulled back, and the cam presses up against the brake shoe 126 and the brake shoe 126 is forced into contact with the circular hub of housing 140 and further movements backwards of the handle grip bars 28 causes the brake cable 128 to pull the calipers 33 into contact with the wheel(s), thereby braking the vehicle. In addition, braking force is directly proportional to the force applied by the rider by pulling the tiller tube backwards. Releasing the brake button 112 allows the spring 117 to return the brake button 112 to its original unbraked position, thereby rotating the cam 124 to its free position out of contact with the brake shoe 126. Of course, it should be readily apparent that braking of the vehicle can be accomplished at any position of the tiller tube.

Also shown in FIG. 18 is an end element 132 mounted to the steering tube 72. This element 132 is provided with a blind bore 134 which seats one end of the spring 117, the other end thereof bearing against a suitable shoulder 136 on the lower end of the brake rod 116 or it may bear against a pin passing through the brake rod 116. A threaded fastener 138 locks the end element 132 to the tiller tube 26 and the lower end of the steering housing structure 140. A suitable C-shaped retainer ring 142 locks the end element 132 in position about the steering tube 72.

Figure 18A:
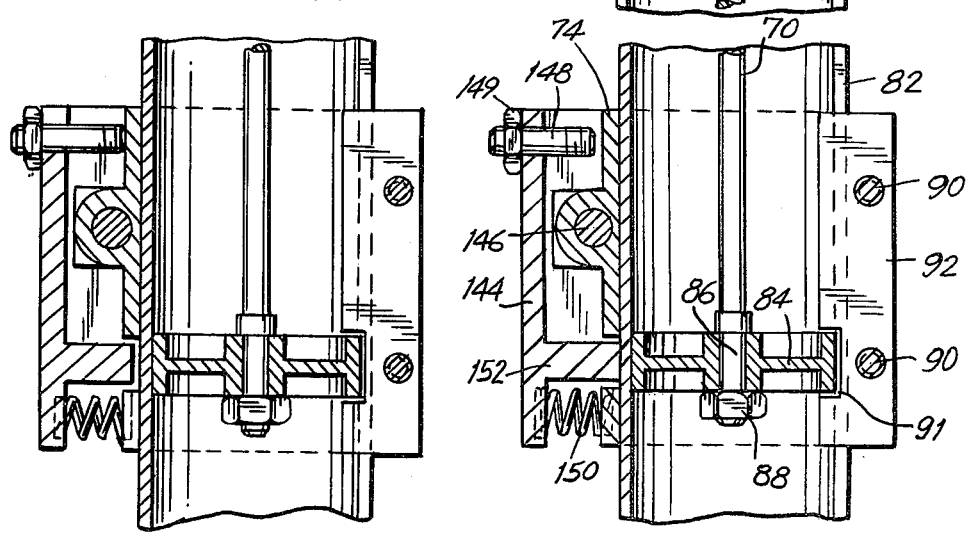
FIG. 18A is a sectional view, similar to FIG. 18, but showing the speed changing mechanism at its released position.

Referring again to the bottom portion of FIGS. 18 and 18A and to FIG. 12, the L-shaped element 144 is attached to sheave 44 and is pivotable about the shaft 146 of the pulley-like disk or sheave 44. A set screw or like fastener 148 provided with a cooperatively associated locking nut 149 limits the pivoting action of one or more springs 150, which depending upon whether the drive cable 32 is in tension or not, pivots the L-shaped element 144 about shaft 146 leaving a gap or clearance between the body of the sliding sleeve 74 and the end of fastener 148 or the bottom end of the extension 152 of the L-shaped element 144 and the tiller tube 26. The action of the sheave 44 and L-shaped element 144 enables the latter element to bear against the tiller tube 26 when the drive cable 32 pulls, thereby locking the body 74 in place and precluding slippage along the tiller tube 26 during the working stroke. The locked position is shown in FIG. 18. This arrangement also relieves cable pull induced by the jockey pulley 36 so that the sheave 44 can freely slide up and down the tiller tube 26 whenever the operator ceases to pull or push the tube steering head, thereby aiding the changing of "gearing" speeds. A suitable C-shaped locking washer 154, as shown in FIG. 12, locks the shaft 146 of the sheave 44 to the body or housing 74. The release position is shown in FIG. 18A. Of course, it should be recognized that another element, such as a wedge, may be employed in lieu of the rotatable sheave 44, inasmuch as the movement or "pivoting action" of said sheave simply goes from one position (locked) to another position (released or unlocked).

In FIGS. 7–10, there is shown an alternate steering system of the cable type in contrast to the shaft steering system of FIGS. 15–18. Such a system may be employed either in my bicycle or tricycle embodiments of the invention. As an alternate to the circular rack 100 of FIGS. 16–18, either of which may be alternatively employed, a freely sliding, straight pivoting rack 156 is mounted about shaft 158 as shown in FIGS. 8 and 10. Side plates 160 enable the straight pivoting rack 156 to follow the angular movement of the tiller tube 26 while maintaining its meshing engagement with the segment gear 98 which is mounted to the steering tube 72. A pulley 162 mounted on shaft 163 comprising grooves maintaining a steering cable 164 which is suitably wrapped about a steering pulley or spindle 166 suitably mounted on steering shaft 168 (see FIG. 8A). The straight pivoting rack 156 or alternatively circular rack (FIG. 9) is in mutually cooperative association with the pulley 162 by anchors 161 holding a cable 164 upon which a ball 170 is fixedly located to engage a compatible groove 172 and thereby maintain the relationship of pulley 162 with rack 156 or so that the transverse movement of rack 156 pulls anchor 161 thereby pulling cable 164 around pulley 162. The end of cable 164 is suitably anchored in pulley 166 which is then rotated due to the pull of cable 164 when rack 156 or 100 is moved, thereby causing the front wheel to be controllably turned. Suitably, other tension translating devices, such as a chain, may be used in lieu of the steering cable. Preload screw locks the pulleys 166 together.

Figure 9:
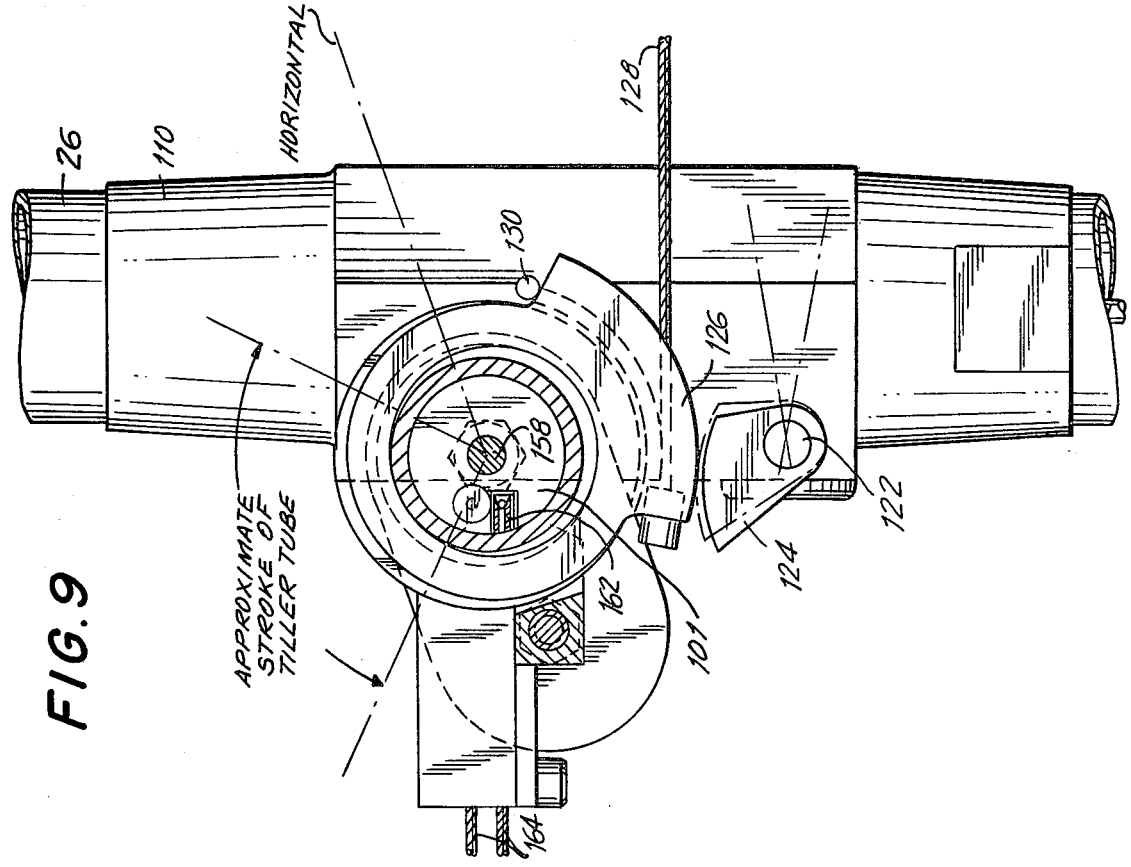
FIG. 9 is a side elevational view in the direction of line 9—9 of FIG. 7.

A mating translatable carrier 101, is best shown in FIGS. 8–10, and said carrier is used to anchor the ends of cable 164 and translates under the influence of rack 156 and its mating gear 98. Alternately, in an embodiment employing cable steering, the translatable means comprises a non-pivoting circular rack or segment or sector rack (such as shown in FIG. 16, element 100), as schematically shown in FIG. 21.

In the tricycle embodiment of FIG. 14, the steering cable 164 rotates further wheel spindles 174 which in turn are suitably cooperatively associated with conventional wheel steering mechanisms 176 for the two front wheels of the tricycle 178.

FIG. 14B illustrates a typical rear axle arrangement for permitting "free wheeling" of the rear wheel(s) in both forward and rearward directions so that the vehicle can be rolled backwards or forwards, if desired. Of course, free wheeling in both directions does not require the movement of the tiller tube. As shown therein, the rear wheel 400 (same as 22 of FIG. 1) is supported on a hub 402 about rear shaft 404. The unidirectional (one-way) clutches 406 and 408 are suitably rotatably supported at opposite ends of said shaft 404 and held in place by retainer rings 410 and 412.

One or more spring-loaded shear pins 414 supported by the hubb 402 are releasably engageable with the rear shaft 404 by a slidable cam 416 mounted on an axle shaft 417 within a bore of the rear shaft 404. The cam 416 is constantly maintained in the "free" non-contacting portion so as to maintain a rear wheel engaged with the rear shaft 404 by means of compression spring 418. A hook 420 in the form of a flat-shaped element suitably connected to a release cable 422 is engageable with the end of the cam 416 to shift the cam 416 into the contacting position to force a free rolling ball 424 radially outwardly. This action moves the shear pin 414 out of engagement with the rear shaft 404, thus disengaging the rear wheel 400 or 22 from the rear shaft 404 and thereby releasing the rear wheel from the action of the clutch of said wheel. As a result, the vehicle may then be rolled backwards against the direction of normal vehicle movement provided by the unidirectional (one-way) clutches.

In FIGS. 19 and 20, a modified cable steering device without gears is shown as compared to the geared cable steering mechanism illustrated in FIGS. 7–8 and 10. One of the advantages of this type of cable steering is the lack of gears which eliminate any backlash problems. Thus, this steering system would, therefore, be capable of more accurate and responsive steering. As shown therein, shaft 200, similar to the shafts 102 and 158 of FIGS. 8–10 and 15–18, supports and holds a shuttle-slider 202 comprising a two-piece assembly consisting of a male element 204 and a female element 206. Pulley 208, similar to pulley 162, comprises upper and lower cable grooves which are cooperatively associated with the shuttle-slider 202–206 and a steering pulley 210 and its pair of upper and lower cable grooves. In this particular embodiment of the cable steering mechanism, cable 212 is suitably anchored in steering pulley 210 at 213 and the cable ends are suitably anchored oppositely each other in the female element 206 after passing over suitable guides 214. Similarly, cable 216 is suitably anchored as shown in phantom in pulley 166 (see FIGS. 8–8A where cable is identified by the reference numeral 164) and the cable ends are suitably anchored opposite by each other in the male element 204 after passing over suitable guides 218. As the tiller tube handle is turned to steer the vehicle, pulley 210 rotates and in turn pulls the cable 212 to pull the female element 206, thereby automatically pulling the male element 204 and the entire shuttle-slider assembly 202 along the shaft 200. The male element 204 and cable 216 in turn then pulls pulley 166 to rotate the steering spindle 168.

In the embodiment incorporating two front wheels, as shown in FIG. 14, for example, in the specific tricycle form of the invention, the cable 216 (shown as 164 in FIG. 14) is suitably anchored on the left and right king pins 174 and 176 (spindles) of the front wheels. The same form of construction would, of course, apply to a quadricycle form of the invention where a pair of rear wheels are disposed on opposite sides of the clutches 34 of FIG. 14 or the clutches 406–408 of FIG. 14B.

It should be recognized that in this embodiment of the cable steering device as in all other alternate forms, the steering devices or mechanism all permit full steering capability in any angular stroke position of the tiller tube.

It should be noted that the reference arrowheads shown in some of the figures of the drawings are used to simply indicate the rotational movement of a shaft or element or to show a direction of movemment in a plane, such as the push-pull movement of the tiller tube.

It will also be appreciated that the construction of the tiller tube involves intricate detail and is of considerable importance since it controls all the basic functions of steering, speed changing and of the braking action for the bicycle or tricycle structures of my invention. Also, while I may have described one system in a particular fashion to perform a function, it should be inherently obvious that other systems may likewise be employed to accomplish the same end result or function. In addition, with the operation of the tiller tube, muscles of the legs, arms, and torso are all employed separately or together in combination to provide the driving power to the cable system for turning the clutches which rotate the rear wheel or wheels, such as in a tricycle embodiment where the paired wheels are mounted at the rear of the frame. Furthermore, braking can also be accomplished through the use of conventional caliper-type hand brakes. While such a brake is shown at the rear wheel in FIGS. 2 and 14, a front wheel can also be operated by the same technique. The brake also can be readily controlled by suitable hand grips mounted on the handle bars or on any other suitable surface.

In FIG. 22, a schematic representation of an alternate cable steering embodiment is illustrated. As shown therein, a translatable circular rack is employed between the gear means of the tiller tube and another gear means, on the shaft of which is mounted a cable pulley which has mounted thereon the ends of the steering cables. The cable steering system shown in this FIG. 22 can be compared with that of FIGS. 14A and 15 which show shaft steering, and it will be noted that a conversion can be made by substituting the pulley wheel and cable of FIG. 22 for the shaft (108) and its associated linkages (FIG. 19A).

It will be appreciated that where reference is made to use of one-way or uni-directional clutches in the vehicles of the invention, such clutches may comprise any number of suitable devices, such as spray clutches, roller clutches, ratchet and pawl clutches, ball-type clutches and the like.

Although the embodiments illustrated in the drawings and described herein demonstrate several design variations and modifications possible within the framework of the invention, it will be apparent to those skilled in the art that other alternate constructions or modifications may be resorted to and made by one having ordinary skill in the art without necessarily departing from the spirit and scope of this invention.

What is claimed is:

1. A wheeled vehicle adapted to be propelled by a rider comprising:
   a frame,
   at least one front and rear wheel rotatably mounted on said frame;
   a tiller tube, having a pair of handle bars at one end thereof and a pair of foot pedals at the other end thereof for oscillatory movement of said tiller tube about an axis;
   drive means passing about a plurality of pulleys on said frame and at least one unidirectional clutch when driven by said drive means turns at least one of said pulleys;
   said drive means including at least a length of cable, the ends of which are anchored to a sheave rotatably mounted to said tiller tube;
   means for steering said vehicle in any position of the working cycle of said tiller tube;
   means for moving said sheave along said tiller tube so as to go from a high-speed drive (level ride condition) to a low speed drive (hill climbing condition) and vice-versa; and
   means for locking and unlocking said sheave in any position along said tiller tube.

2. The wheeled vehicle according to claim 1, including means for braking said vehicle in any position of said tiller tube.

3. The wheeled vehicle according to claim 2, wherein said means for braking comprises a cam actuated rotatable braking actuator connected to at least one brake on a front or rear wheel by means of a braking cable.

4. The wheeled vehicle according to claim 3, wherein said cam is rotated into contact with said rotatable brake actuator by means of a push-rod and cooperatively associated lever arm.

5. The wheeled vehicle according to claim 4, wherein said lever arm is keyed to a shaft turning said cam actuated rotatable brake actuator.

6. The wheeled vehicle according to claim 1, wherein said means for moving said sheave along said tiller tube comprises moving said sheave up and down said tiller tube by means of a flexible element means disposed and guided about hub means mounted on handle bars, and said flexible element means being connected to a push rod, and said push rod being in cooperative association with a sliding sleeve connected to said sheave for moving up and down said tiller tube upon response to said push rod being actuated by rotatable motion imparted to said hub by means for turning mounted within said handle bars.

7. The wheeled vehicle according to claim 6, wherein said means for turning comprises for each of said handle bars, a spring-loaded slide button mounted to shaft means connected to said hub and a pin in said handle bar engagable with said shaft means, for rotating said hub and advancing said flexible element means to transmit a force to said push rod, thereby moving said sliding sleeve and said sheave along said tiller tube.

8. The wheeled vehicle according to claim 7, wherein said sheave mounted on said tiller tube comprises a pair of half-sheaves, and each end of the cable of said drive means being anchored to one of said half-sheaves.

9. The wheeled vehicle according to claim 1, wherein said cable is a tension element which is flexible so as to wrap around pulleys.

10. The wheeled vehicle according to claim 1, wherein said means for steering comprising cable steering.

11. The wheeled vehicle according to claim 10, wherein said means for cable steering said vehicle comprising a steering tube, having a segment gear, and being disposed within said tiller tube, and translatable means geared to said segment gear for rotating pulley means connected to a steering shaft for steering said front wheel by means of a cable.

12. The wheeled vehicle according to claim 11, wherein the ends of said cable are secured to opposite ends of said translatable means.

13. A wheeled vehicle according to claim 12, wherein said cable includes a ball wedge secured thereto for meshing with a notched cutout in said pulley means so as to facilitate synchronizing said steering from input to output.

14. The wheeled vehicle according to claim 10, wherein said means for cable steering said vehicle, comprising a steering tube disposed within said tiller tube; and translatable means disposed between said tiller tube and pulley means; said translatable means being in mutually cooperative association with said steering tube and said pulley means; and cable means about said pulley means connecting said front wheel and said translatable means so as to transmit any steering movement from said steering tube to said front wheel.

15. The wheeled vehicle according to claim 14, wherein said cable means comprises two cables, and one of the ends of each said cable are secured to said translatable means.

16. The wheeled vehicle according to claim 15, wherein said translatable means comprises a two-piece member.

17. The wheeled vehicle according to claim 16, wherein said two-piece member comprises a male member and a female member, and the ends of each cable are secured in place in one of said members.

18. The wheeled vehicle according to claim 17, wherein said two-piece member comprises rack means and a mating translatable carrier.

19. The wheeled vehicle according to claim 14, wherein said translatable means comprises a non-pivoting circular rack means.

20. The wheeled vehicle according to claim 1, wherein said means for steering comprising shaft steering.

21. The wheeled vehicle according to claim 20, wherein said means for steering said vehicle comprising a steering tube disposed within said tiller tube, and gearing means disposed between said steering tube and a steering shaft connected to said front wheel.

22. The wheeled vehicle according to claim 21, wherein said gearing means between said steering tube and steering shaft comprising a translatable gear rack which meshes with segment gears on said steering tube and said steering shaft.

23. The wheeled vehicle according to claim 1, wherein said vehicle includes a pair of front wheels.

24. The wheeled vehicle according to claim 1, wherein said vehicle is a four wheeler.

25. The wheeled vehicle according to claim 1, wherein said vehicle is a three wheeler with a pair of rear wheels.

26. The wheeled vehicle according to claim 25, wherein a pair of unidirectional clutches are employed.

27. The wheeled vehicle according to the claim 1, wherein one of said wheels is a jockey pulley pivotably mounted to said frame and resilient means maintaining tension on said drive means.

28. The wheeled vehicle according to claim 1, wherein said drive means is a combination chain-cable element, and wherein the cable portion passes over said plurality of pulleys, and the chain portion passes over sprocket wheels connected to said unidirectional clutch.

29. A wheeled vehicle adapted to be propelled by a rider comprising:
a frame,
at least one front and rear wheel rotatably mounted on said frame;
a tiller tube, having a pair of handle bars at one end thereof and a pair of foot pedals at the other end thereof for oscillatory movement of said tiller tube about an axis;
drive means including at least a length of cable, the ends of which are anchored to a sheave rotatably mounted to said tiller tube;
speed changing means including means for moving said sheave along said tiller tube; and
means for steering and means for braking said vehicle in any position of the working cycle of said tiller tube.

30. The wheeled vehicle according to claim 29, including a front pair of wheels.

31. The wheeled vehicle according to claim 30, wherein said means for steering comprising shaft steering.

32. The wheeled vehicle according to claim 30, wherein said means for steering comprising cable steering.

33. The wheeled vehicle according to claim 30, further including a rear pair of wheels.

34. The wheeled vehicle according to claim 29, including means enabling the free-wheeling of said wheels.

35. The wheeled vehicle according to claim 29, wherein said cable is a tension element which is flexible so as to wrap around pulleys.

36. A wheeled vehicle adapted to be propelled by a rider comprising:
a frame,
at least one front and rear wheel rotatably mounted on said frame;
a tiller tube, having a pair of handle bars at one end thereof and a pair of foot pedals at the other end thereof for oscillatory movement of said tiller tube about an axis;
drive means passing about a plurality of pulleys on said frame and at least one unidirectional clutch which when driven by said drive means turns at least one of said wheels;
said drive means including at least a length of cable, the ends of which are anchored to a sheave rotatably mounted to said tiller tube;
means for steering said vehicle in any position of the working cycle of said tiller tube; and
said means for steering said vehicle comprising shaft steering including a steering tube disposed within said tiller tube, and gearing means disposed between said steering tube and a steering shaft being connected to said front wheel and comprising a translatable gear rack which meshes with said segment gears on said steering tube and said steering shaft.

37. A wheeled vehicle adapted to be propelled by a rider comprising:
a frame,
at least one front and rear wheel rotatably mounted on said frame;
a tiller tube, having a pair of handle bars at one end thereof and a pair of foot pedals at the other end thereof for oscillatory movement of said tiller tube about an axis;
drive means passing about a plurality of pulleys on said frame and at least one unidirectional clutch which when driven by said drive means turns at least one of said wheels;

said drive means including at least a length of cable, the ends of which are anchored to a sheave rotatably mounted to said tiller tube;

means for steering said vehicle in any position of the working cycle of said tiller tube comprising cable steering; and said cable steering comprising a steering tube, having a segment gear, and said steering tube being disposed within said tiller tube, and translatable means geared to said segment gear for rotating pulley means connected to a steering shaft steering said front wheel by means of a cable.

38. A wheeled vehicle according to claim 37, wherein the ends of said cable are secured to opposite ends of said translatable means, and said cable includes a ball wedge secured thereto for meshing with a notched cutout in said pulley means so as to facilitate synchronizing said steering from input to output.

39. A wheeled vehicle adapted to be propelled by a rider comprising:

a frame, at least one front and rear wheel rotatably mounted on said frame;

a tiller tube, having a pair of handle bars at one end thereof and a pair of foot pedals at the other end thereof for oscillatory movement of said tiller tube about an axis;

drive means passing about a plurality of pulleys on said frame and at least one unidirectional clutch which when driven by said drive means turns at least one of said wheels;

said drive means including at least a length of cable, the ends of which are anchored to a sheave rotatably mounted to said tiller tube;

means for steering said vehicle in any position of the working cycle of said tiller tube comprising cable steering; and said cable steering comprising a steering tube disposed within said tiller tube, and translatable means disposed between said tiller tube and pulley means; said translatable means being in mutually cooperative association with said steering tube and said pulley means; and cable means about said pulley means connecting said front wheel and opposite ends of said translatable means so as to transmit any steering movement from said steering tube to said front wheel.

40. A wheeled vehicle adapted to be propelled by a rider comprising:

a frame, at least one front and rear wheel rotatably mounted on said frame;

a tiller tube, having a pair of handle bars at one end thereof and a pair of foot pedals at the other end thereof for oscillatory movement of said tiller tube about an axis;

drive means passing about a plurality of pulleys on said frame and at least one unidirectional clutch which when driven by said drive means turns at least one of said wheels;

said drive means including at least a length of cable, the ends of which are anchored to a sheave rotatably mounted to said tiller tube;

means for steering said vehicle in any position of the working cycle of said tiller tube comprising cable steering; and said cable steering comprising a steering tube disposed within said tiller tube; and translatable means disposed between said tiller tube and pulley means; said translatable means being in mutually cooperative association with said steering tube and said pulley means; and cable means about said pulley means connecting said front wheel and said translatable means so as to transmit any steering movement from said steering tube to said front wheel.

41. The wheeled vehicle according to claim 40, wherein said cable means comprises two cables, and one of the ends of each said cable is secured to said translatable means.

42. The wheeled vehicle according to claim 41, wherein said translatable means comprises a two-piece member.

43. The wheeled vehicle according to claim 42, wherein said two-piece member comprises a male member and a female member, and the ends of each cable are secured in place in one of said members.

44. The wheeled vehicle according to claim 43, wherein said two-piece member comprises rack means and a mating translatable carrier.

45. The wheeled vehicle according to claim 40, wherein said translatable means comprises a non-pivoting circular rack means.

* * * * *